US010904776B2

(12) United States Patent
Arab et al.

(10) Patent No.: US 10,904,776 B2
(45) Date of Patent: Jan. 26, 2021

(54) SMART IOT SELF-HEALING NETWORK

(71) Applicant: Verizon Patent and Licensing Inc., Arlington, VA (US)

(72) Inventors: Aliasghar Arab, Colonia, NJ (US); Nanjun Qian, Princeton, NJ (US); Jeremy Nacer, Denville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 273 days.

(21) Appl. No.: 15/592,887

(22) Filed: May 11, 2017

(65) Prior Publication Data

US 2018/0332486 A1 Nov. 15, 2018

(51) Int. Cl.
*H04W 24/04* (2009.01)
*H04W 52/02* (2009.01)
*H04W 84/20* (2009.01)

(52) U.S. Cl.
CPC ....... *H04W 24/04* (2013.01); *H04W 52/0219* (2013.01); *H04W 52/0261* (2013.01); *H04W 52/0277* (2013.01); *H04W 84/20* (2013.01)

(58) Field of Classification Search
CPC ......... H04L 12/10; H04L 41/20; H04L 67/12; H04L 67/20; H04W 4/16; H04W 4/18; H04W 52/0261; H04W 74/02; H04W 84/20; H04W 24/04; H04W 52/0219; H04W 52/0277
See application file for complete search history.

(56) References Cited

U.S. PATENT DOCUMENTS

| 8,422,988 | B1* | 4/2013 | Keshav | H04L 12/10 |
| | | | | 455/405 |
| 9,654,948 | B1* | 5/2017 | Belser | H04W 4/16 |
| 9,781,008 | B1* | 10/2017 | Notari | H04L 41/12 |
| 2003/0124979 | A1* | 7/2003 | Tanada | H04W 84/20 |
| | | | | 455/41.1 |
| 2005/0237979 | A1* | 10/2005 | Kim | H04W 84/20 |
| | | | | 370/331 |
| 2011/0117907 | A1* | 5/2011 | Hooli | H04W 72/02 |
| | | | | 455/422.1 |
| 2015/0373482 | A1* | 12/2015 | Barnard | H05B 37/0272 |
| | | | | 370/338 |
| 2016/0353385 | A1* | 12/2016 | Skocypec | H04W 52/0261 |
| 2017/0006595 | A1* | 1/2017 | Zakaria | H04L 67/12 |
| 2017/0161786 | A1* | 6/2017 | Terazaki | H04W 84/20 |
| 2018/0183685 | A1* | 6/2018 | Cook | H04L 67/12 |

\* cited by examiner

*Primary Examiner* — Michael Thier
*Assistant Examiner* — Prince A Mensah

(57) ABSTRACT

A method, a device, and a non-transitory storage medium are provided to provide an active coordinator service in a sensor network, analyze maintenance information that indicates a battery level of a device, determine whether the device can continue to provide the active coordinator service; request maintenance information from another network device in the sensor network when the battery level does not satisfy a threshold level, determine whether the other network device can provide the active coordinator service based on its maintenance information, cease providing the active coordinator service when the other network device can provide the active coordinator service, in which a long-range wireless communication interface is turned off, and enable an IoT service that includes turning on a sensor, generating sensor information, and transmitting the sensor information to the other network device.

20 Claims, 8 Drawing Sheets

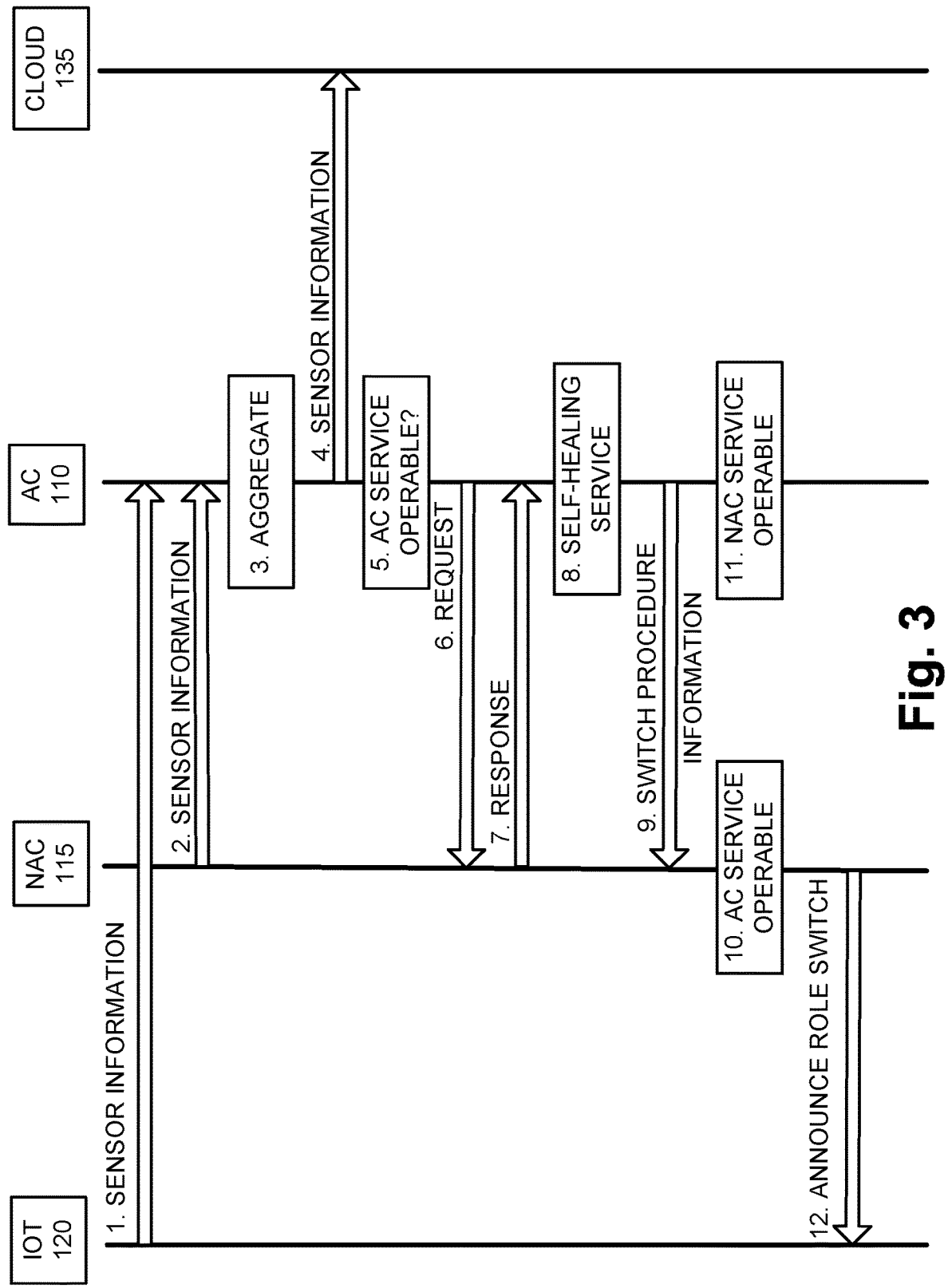

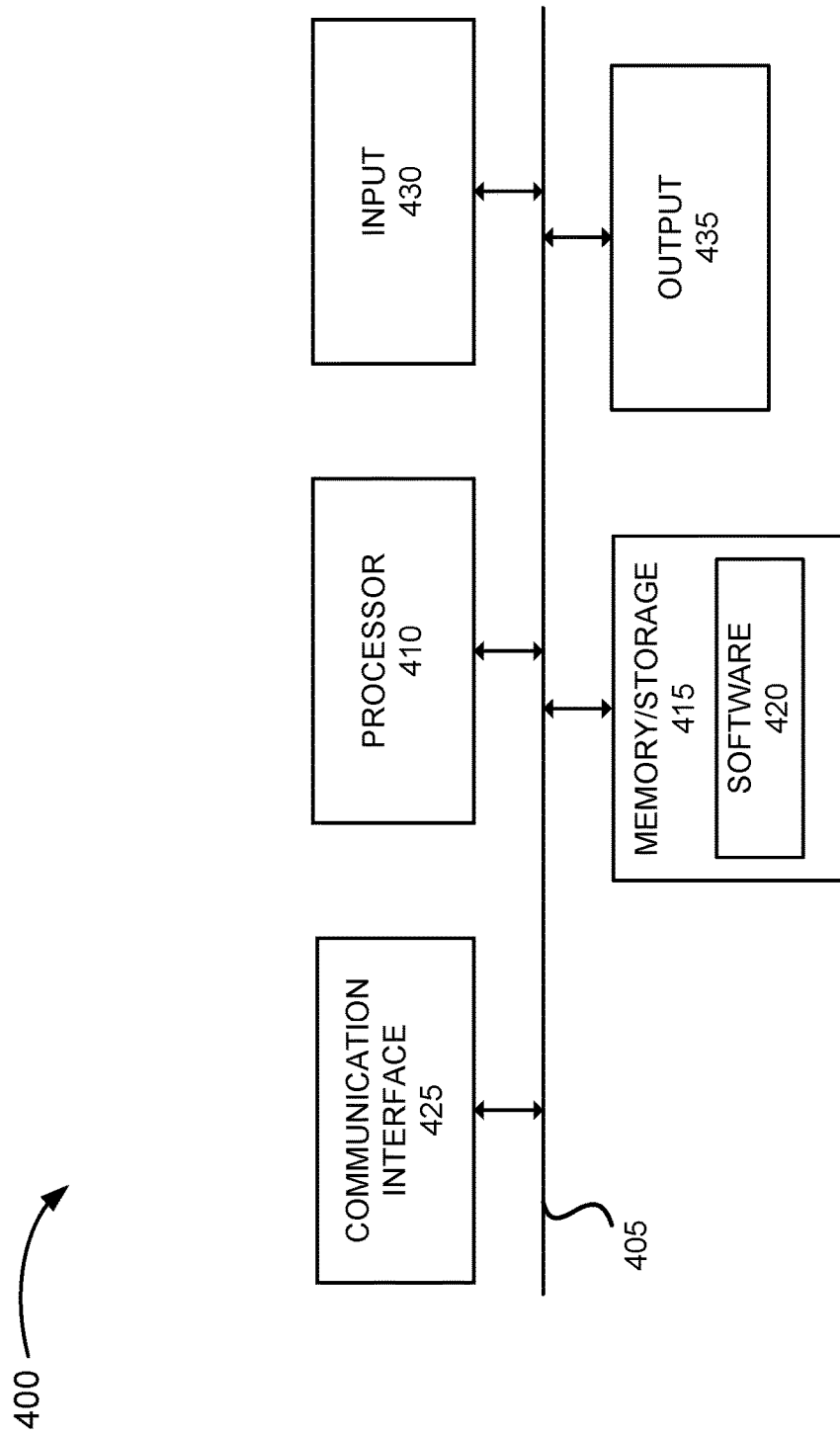

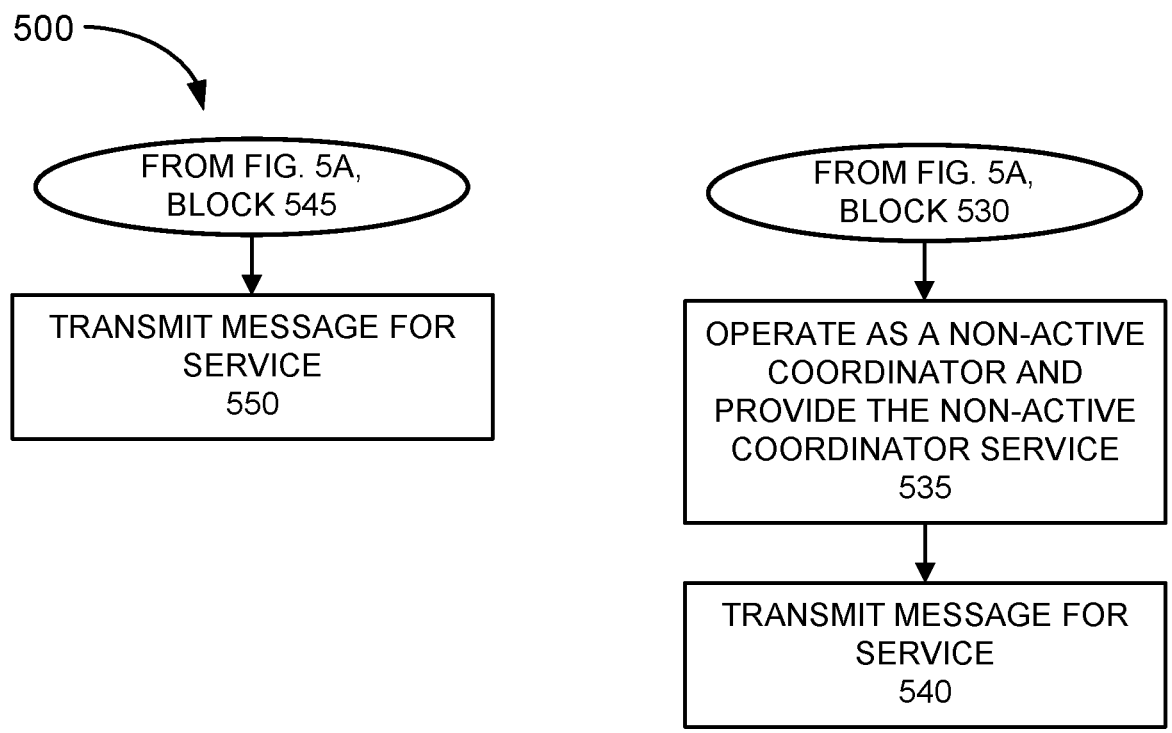

SMART IOT SELF-HEALING NETWORK

BACKGROUND

Internet of Things (IoT) technology refers to a wide range of devices. Since IoT technology has nearly limitless applications that can be leveraged to form new and useful services, interest among service providers and developers in IoT technology continues to increase. In a wireless sensor network, typically, the IoT devices transmit sensor information to a coordinator, which in turn, transmits the sensor information to the Internet.

BRIEF DESCRIPTION OF THE DRAWINGS

FIG. 3 is a diagram illustrating another exemplary process of the self-healing service;

FIG. 4 is a diagram illustrating exemplary components of a device that may correspond to one or more of the devices illustrated herein;

FIGS. 5A and 5B are flow diagrams illustrating an exemplary process of an exemplary embodiment of the self-healing service.

DETAILED DESCRIPTION OF PREFERRED EMBODIMENTS

Figure 1:
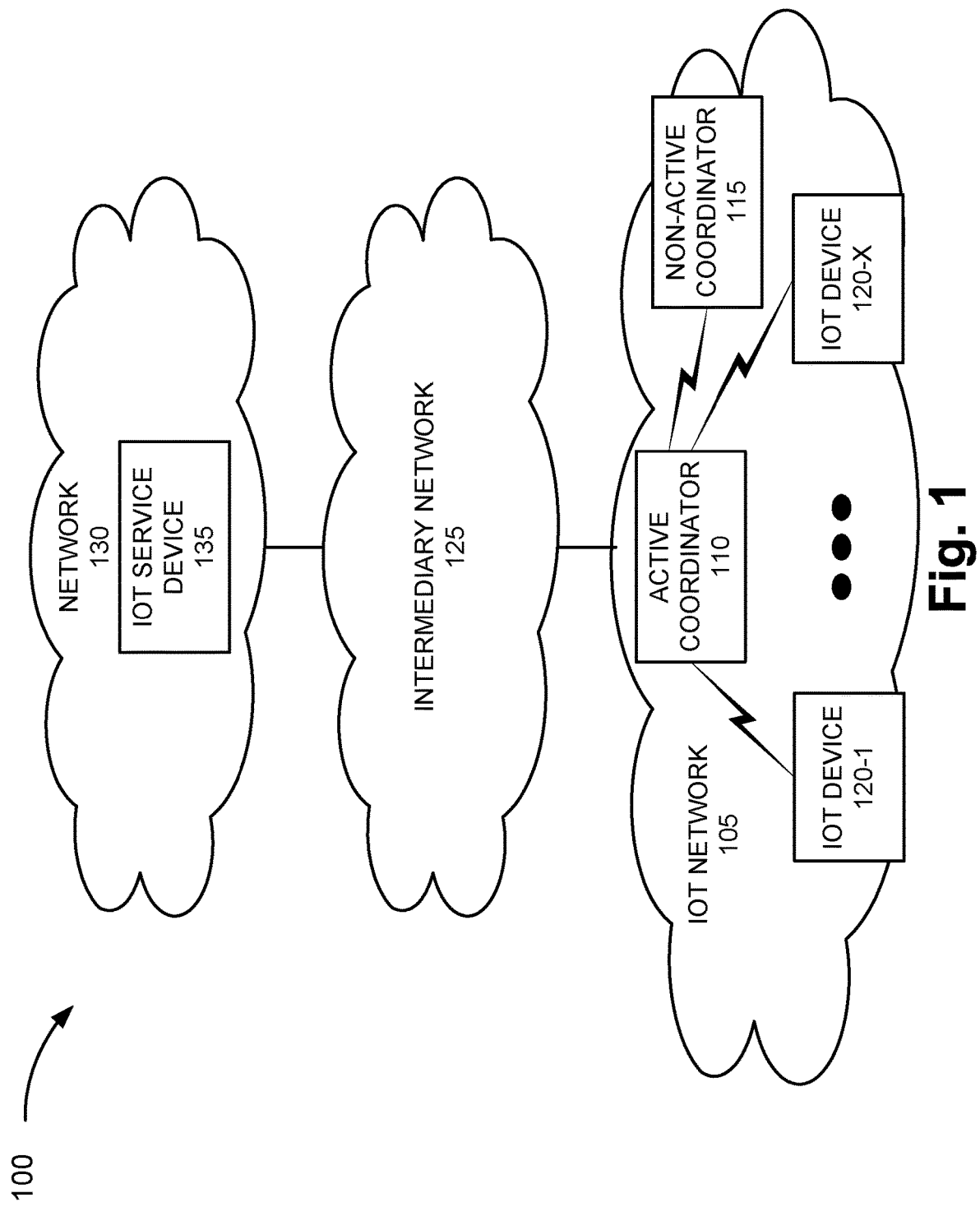
FIG. 1 is a diagram illustrating an exemplary environment in which an exemplary embodiment of a self-healing service may be implemented.

The following detailed description refers to the accompanying drawings. The same reference numbers in different drawings may identify the same or similar elements. Also, the following detailed description does not limit the invention.

IoT devices have become widespread and their uses have continued to expand. In a conventional wireless sensor network, IoT devices transmit information to a coordinator via routers. In turn, the coordinator transmits the information to the Internet. Unfortunately, there is only one coordinator in the wireless sensor network. As an example, an IoT Zigbee network includes only one coordinator. Alternatively, according to another example of an IoT network, which has a mesh architecture, there is not a mechanism for redundancy when the coordinator malfunctions, runs out of power (e.g., battery power), or is subject to a security hack.

According to exemplary embodiments, a self-healing service in a network is described. According to an exemplary implementation, the network is a smart sensor network. According to an exemplary embodiment, the self-healing service includes dynamic network role-switching pertaining to a coordinator and a non-active coordinator included in a network. According to an exemplary implementation, the dynamic network role-switching may be implemented locally. For example, an active coordinator may include logic that selects a non-active coordinator to operate as the active coordinator, and the active coordinator may switch from operating as the active coordinator to operating as an IoT device. According to another exemplary implementation, the dynamic network-role switching may be implemented remotely. For example, a device other than the active coordinator may determine whether a dynamic network role-switching procedure should occur. For example, a cloud-based device or other remote device may make the selections of active and non-active coordinators and invoke the dynamic network role-switching via the active coordinator.

According to an exemplary embodiment, the active coordinator includes logic that provides an active coordinator service. According to an exemplary embodiment, the active coordinator service maintains an active connection to an application server, a cloud device, or other type of network device that supports an IoT service (referred to as an IoT service device). The active coordinator service collects and/or aggregates sensor information and maintenance information from the IoT devices. The active coordinator service provides the sensor information and the maintenance information to the IoT service device.

According to an exemplary embodiment, the active coordinator includes logic that provides a non-active coordinator service. The non-active coordinator service may provide a sensor-based IoT service similar to that provided by an IoT device. In this regard, according to an exemplary embodiment, the active coordinator and the non-active coordinator include the same functionality (e.g., hardware logic or hardware and software logic), however, when the active coordinator operates as a non-active coordinator, the active coordinator provides only the non-active coordinator service, and the active coordinator service and its corresponding functions may be disabled or turned off. Conversely, when the active coordinator provides the active coordinator service, the non-active coordinator service and its corresponding functions may be disabled or turned off.

According to an exemplary embodiment, the active coordinator includes logic that provides the self-healing service. For example, as described herein, the dynamic network role-switching may be implemented locally (e.g., by the active coordinator) or remotely (e.g., by a device remote from the active coordinator).

As a result, the network's reliability and battery life may be improved. For example, based on the dynamic switching of network roles, the overall network battery run time may be extended, malfunctions that occur may be overcome, and data throughput may be improved. Further, the self-healing service provides flexibility regarding the sensor's type, the topology of the network, and the wireless communication of the application.

FIG. 1 is a diagram illustrating an exemplary environment 100 in which an exemplary embodiment of a self-healing service may be implemented. As illustrated, environment 100 includes an IoT network 105, an intermediary network 125, and a network 130. IoT network 105 includes an active coordinator 110, a non-active coordinator 115, and IoT devices 120-1 through 120-X (also referred to collectively as IoT devices 120 and, individually or generally as IoT device 120). Network 125 includes an IoT service device 135. According to other embodiments, environment 100 may include additional networks, fewer networks, and/or different types of networks than those illustrated and described herein.

Environment 100 includes communication links between the networks and between the devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

IoT network 105 includes a network that provides an IoT service. According to an exemplary implementation, the IoT service is a sensor-based service. For example, the sensor-based service may pertain to weather monitoring, light management, parking monitoring, or other IoT-based application.

Active coordinator 110 includes a device that has computational and communicative capabilities. According to an exemplary embodiment, active coordinator 110 includes a battery and is powered by the battery. According to an exemplary embodiment, active coordinator 110 includes a modem that may be used when communicating with network 130 and IoT service device 135 (when operating as the active coordinator). According to an exemplary implementation, the modem operates according to a Long Term Evolution (LTE) Cat-M1 standard. According to other exemplary implementations, the modem may operate according to another long-range wireless standard (e.g., LTE Narrow-Band-IoT (NB-IoT), a Fifth Generation (5G) standard, etc.), or a proprietary specification. According to an exemplary embodiment, active coordinator 110 includes a sensor that collects sensor information and a short-range wireless communication interface similar to that described in relation to IoT device 120. Active coordinator 110 may be implemented to include a low power wireless microcontroller (MCU) and a long-range wireless communication interface (e.g., LTE, etc.).

According to an exemplary embodiment, active coordinator 110 includes logic that supports the self-healing service. According to an exemplary embodiment, active coordinator 110 includes logic that determines whether its battery level is low. For example, active coordinator 110 may measure its current battery level and compare the current battery level to a threshold battery level. When the current battery level is equal to or less than the threshold battery level, active coordinator 110 determines that its battery level is low. Based on such a determination, active coordinator 110 may initiate the self-healing service. Additionally, or alternatively, active coordinator 110 includes logic that determines its connectivity state to network 130 or IoT service device 135. When the connectivity state is down or impaired (e.g., intermittent connection and disconnection), active coordinator 110 may initiate the self-healing service. For example, active coordinator 110 may use its battery level and/or its connectivity state as a basis for determining whether the active coordinator service can be provided.

According to an exemplary embodiment of the local dynamic network-role switching and the remote dynamic network-role switching, in response to determining a low battery and/or a connectivity issue, active coordinator 110 includes logic that obtains a battery level and/or a connectivity state from non-active coordinator 115. For example, active coordinator 110 may transmit a message that requests this maintenance information from non-active coordinator 115. Additionally, or alternatively, non-active coordinator 115 may proactively transmit to active coordinator 110 the maintenance information. As an example, non-active coordinator 115 may periodically ping active coordinator 110 with the maintenance information.

According to the remote dynamic network role-switching implementation, in response to obtaining the battery level and/or the connectivity state of non-active coordinator 115, active coordinator 110 provides this maintenance information to IoT service device 135. As described herein, based on an analysis of the maintenance information, IoT service device 135 may invoke the dynamic network role-switching procedure. For example, IoT service device 135 may select non-active coordinator 115 to operate as an active coordinator, and select active coordinator 110 to operate as a non-active coordinator. IoT service device 135 may transmit a message indicating to initiate the dynamic network role-switching procedure to active coordinator 110. In response to receiving the communication from IoT service device 135, the dynamic network role-switching procedure is invoked. For example, active coordinator 110 disables or turns off the active coordinator service (e.g., including hardware or hardware and software), and enables or turns on the non-active coordinator service in which active coordinator 110 operates as an IoT device that obtains sensor information. Further, active coordinator 110 may transmit a message indicating to initiate the dynamic network role-switching procedure to non-active coordinator 115. In turn, non-active coordinator 115 may enable or turn on the active coordinator service and disable or turn off the non-active coordinator service.

According to the local dynamic network role-switching implementation, in response to obtaining the battery level and/or the connectivity state of non-active coordinator 115, active coordinator 110 includes logic that determines whether non-active coordinator 115 is able to provide the active coordinator service. For example, active coordinator 110 may compare the battery level to the threshold battery level to determine whether the battery level satisfies the threshold battery level. Additionally, or alternatively, active coordinator 110 may compare the battery level of non-active coordinator 115 to its own battery level to determine whether the battery level of non-active coordinator 115 is at least greater than its own battery level. Additionally, or alternatively, active coordinator 110 determines whether non-active coordinator 115 is able to connect to network 130 or IoT service device 135. When active coordinator 110 determines that non-active coordinator 115 is able to provide the active coordinator service, active coordinator 110 initiates a switching procedure in which active coordinator 110 provides the non-active coordinator service, and non-active coordinator 115 provides the active coordinator service, as described herein.

Non-active coordinator 115 includes a device that has computational and communicative capabilities. According to an exemplary embodiment, non-active coordinator 115 includes logic similar to that described in relation to active coordinator 115 in which the active coordinator service, the non-active coordinator service, and the healing service are provided.

IoT device 120 includes an end device that has computational and communicative capabilities. According to an exemplary embodiment, IoT device 120 includes a battery and is powered by the battery. According to an exemplary embodiment, IoT device 120 includes a sensor that collects sensor information. For example, the sensor may be implemented as a weather sensor (e.g., temperature, humidity, moisture, etc.), a presence sensor, a force or a load sensor, a vibration sensor, a light sensor, a motion sensor, an audio sensor, a smart meter, or other type of sensor that detects a condition or a state (e.g., of an environment at which the sensor is located, a service (e.g., a utility service, etc.), a device, etc.). According to an exemplary embodiment, IoT device 120 includes a wireless communication interface. According to an exemplary implementation, the wireless communication interface is of low-cost and short-range. For example, the wireless communication interface may be implemented according to various wireless standards (e.g., ZigBee, Internet Protocol version 6 over Low Power Wireless Personal Area Network (6LoWPAN), Bluetooth Low Energy (BLE), sub-1 Gigahertz (sub-GHz) (e.g., IEEE 802.15.4), Wi-SUN, etc.).

According to an exemplary embodiment, IoT device 120 includes logic that transmits sensor information to active coordinator 110. Additionally, according to an exemplary embodiment, IoT device 120 includes logic that transmits maintenance information to active coordinator 110. According to an exemplary implementation, the maintenance information indicates various device states (e.g., a battery level, a device failure (e.g., a software failure, a hardware failure), network states (e.g., loss of connection with another device (e.g., a router, etc)), or other conditions pertaining to the IoT service.

Intermediary network 125 includes one or multiple networks of one or multiple types. For example, intermediary network 125 may be implemented to include a wireless network, a wired network, and/or an optical network. For example, intermediary network 125 may include a radio access network (RAN), such as a Third Generation (3G) RAN, a 3.5G RAN, a Fourth Generation (4G) RAN, a 4.5G RAN, or a future generation RAN (e.g., a 5G RAN). Intermediary network 125 may include a complementary network pertaining to the one or multiple RANs described. For example, intermediary network 125 may include a core network, such as the core part of an LTE network or an LTE-Advanced network (e.g., an evolved packet core (EPC) network), a Code Division Multiple Access (CDMA) core network, a Global System for Mobile Communications (GSM) core network (e.g., a network switching subsystem (NSS)), and so forth. Depending on the implementation, intermediary network 125 may include various network devices, such as, for example, a gateway device, a support node, a serving node, a mobility management entity (MME), as well other network devices that provide various network-related functions and/or services, such as charging and billing, security, authentication and authorization, network policy enforcement, management of subscriber profiles, and/or other functions and/or services that facilitate the operation of the core network.

Network 130 includes one or multiple networks of one or multiple types. For example, network 130 may be implemented to include a service or an application-layer network, the Internet, the World Wide Web, an Internet Protocol Multimedia Subsystem (IMS) network, a Rich Communication Service (RCS) network, a cloud network, a packet-switched network, a private network, a public network, a telecommunication network, an IP network, or some combination thereof. According to an exemplary embodiment, network 130 provides the self-healing service, as described herein. For example, IoT service device 135 includes logic that provides the self-healing service.

IoT service device 135 includes a device that has computational and communicative capabilities. According to an exemplary embodiment, IoT service device 135 includes logic that provides the IoT service. For example, IoT service device 135 may include a communication interface to receive sensor information and maintenance information from IoT devices 120, and logic that ingests and processes the sensor information to provide a monitoring service, a management service, or other IoT-related application or service.

According to an exemplary embodiment, IoT service device 135 includes logic that provides the self-healing service. According to an exemplary embodiment, IoT service device 135 selects a device included in IoT network 105 to operate as an active coordinator that provides the active coordinator service, and selects a device included in IoT network 105 to operate as a non-active coordinator. IoT service device 135 may invoke the dynamic network switching-role procedure based on an analysis of maintenance information pertaining to active coordinator 110 and non-active coordinator 115. According to an exemplary implementation, the self-healing service may compare a current battery level (e.g., voltage of battery) to a threshold battery level. Additionally, or alternatively, the self-healing service may analyze the connectivity state associated with active coordinator 110 and non-active coordinator 115. Based on the analysis of battery level and connectivity state, IoT service device 135 may select the devices to operate as the active coordinator and non-active coordinator. IoT service device 135 may communicate with the current active coordinator 110 and/or non-active coordinator 115 to initiate the dynamic network switching-role procedure.

According to an exemplary embodiment, IoT service device 135 includes logic that provides an adaptive power-saving service. According to an exemplary embodiment, the adaptive power-saving service determines sensing periods for IoT devices 120 and listening durations for active coordinator 110 to receive sensor and maintenance information. According to an exemplary implementation, the adaptive power-saving service may optimize the network's performance based on various dynamic conditions, such as time of day, weather, or other condition.

Figure 2:
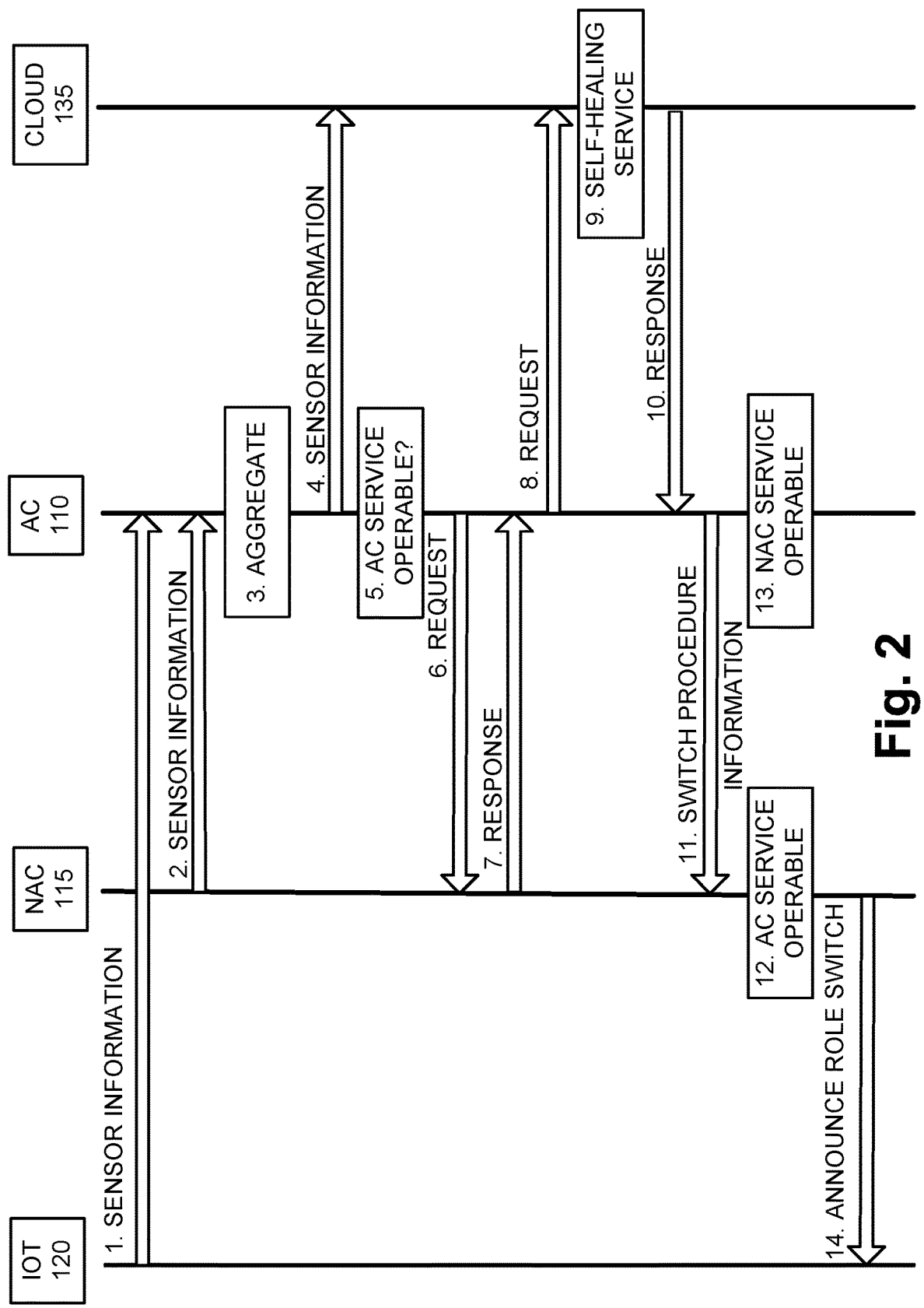
FIG. 2 is a diagram illustrating an exemplary process of the self-healing service.

FIG. 2 is a diagram illustrating an exemplary process of the self-healing service. For example, the process illustrated and described pertains to an exemplary implementation of the remote self-healing service. Referring to FIG. 2, as illustrated in step (1), IoT device 120 may transmit sensor information to active coordinator 110. In step (2), non-active coordinator 115 may also transmit sensor information to active coordinator 110. For example, non-active coordinator 115 may be operating to provide the non-active coordinator service. In step (3), active coordinator 110 may receive and aggregate the sensor information according to the active coordinator service. In step (4), active coordinator 110 transmits the aggregated sensor information to IoT service device 135 (e.g., a cloud device) via intermediary network 125.

In step (5), active coordinator 110 determines whether it is able to provide the active coordinator service based on certain criteria. For example, active coordinator 110 may determine whether its battery level is above a threshold battery level. Additionally, for example, active coordinator 110 may determine whether a connective state with IoT service device 135 is trouble-free. For example, active coordinator 110 may determine whether the long-range wireless communication interface is operating properly (e.g., based on the execution and analysis of a built-in self test) and/or that signal strength is above a threshold signal value. By way of further example, the signal strength may be implemented as a Reference Signal Receive Power (RSRP), a Received Signal Strength Indicator (RSSI), a Reference Signal Received Quality (RSRQ), a signal-to-noise ratio (SNR), a signal-to-interference-plus-noise ratio (SINR), and/or some other channel condition value. According to this exemplary scenario, assume that active coordinator 110 determines that its current battery level is below the threshold battery level and determines that its connective state with IoT service device 135 is trouble-free.

In step (6), in response to such a determination, active coordinator 110 generates and transmits a request for maintenance information to non-active coordinator 115. According to an exemplary implementation, active coordinator 110 may broadcast in the network, which may be received by all devices in the network. According to such an implementation, some devices (e.g., IoT devices 120, routers, etc.) may ignore the request. According to other exemplary implementations, active coordinator 110 may transmit the request as a point-to-point communication (e.g., between active coordinator 110 and non-active coordinator 115). Active coordinator 110 may store a data structure (e.g., a list, a table, etc.) or a database that indicates non-active coordinator 115 (versus IoT devices 120 that may also be sending sensor information to active coordinator 110) in the network.

In step (7), in response to receiving the request, non-active coordinator 115 may generate battery information. For example, non-active coordinator 115 may measure its battery level and store the battery value. Additionally, or alternatively, non-active coordinator 115 may determine whether its battery level is above a threshold battery level and store the result of the comparison. For example, non-active coordinator 115 may compare the measured battery voltage value to a threshold battery voltage value. Also, in response to receiving the request, non-active coordinator 115 may generate connectivity information. According to an exemplary implementation, non-active coordinator 115 may generate connectivity information that indicates the presence of a long-range wireless communication interface and/or modem. According to another exemplary implementation, non-active coordinator 115 may turn on or enable an LTE Cat-M1 modem and attempt to establish a communication link with a long-range wireless network (e.g., an LTE network). Non-active coordinator 115 may generate connectivity information indicating the presence of the long-range wireless interface/modem, the operability of the long-range wireless interface/modem (e.g., based on the execution and analysis of a built-in self test), and/or the result of the attempt to establish the communication link. According to this exemplary scenario, assume that non-active coordinator 115 is able to establish the communication link, and its battery level is above the threshold battery level. In response to generating the battery information and the connectivity information, in step (7), non-active coordinator 115 generates and transmits a response, which carries maintenance information, to active coordinator 110. The maintenance information may include the battery information and the connectivity information. The maintenance information may include other types of information, such as, for example, date and timestamp information and/or network device identifier. In the event that active coordinator 110 does not receive maintenance information from any non-active coordinator 115, active coordinator 110 may transmit the request to another active coordinator 110 (not illustrated) to obtain maintenance information from another grouping of non-active coordinators 115 associated with the other active coordinator 110 and/or the maintenance information from only the other active coordinator 110.

In step (8), in response to receiving the maintenance information, active coordinator 110 transmits a request to IoT service device 135. For example, the request may include the maintenance information from non-active coordinator 115. The request may also include the maintenance information of active coordinator 110 and/or data indicating an invocation of the self-healing service. In step (9), in response to receiving the request, IoT service device 135 provides the self-healing service. For example, IoT service device 135 analyzes the maintenance information and determines which, if any, non-active coordinator 115 may perform the active coordinator service. For example, IoT service device 135 may select the non-active coordinator 115 that has the highest battery level among other non-active coordinators 115. Additionally, for example, any non-active coordinator 115 that did not have an operable long-range wireless interface/modem and/or was unable to attach to the long-range wireless network may be eliminated as a candidate active coordinator. In the event that the maintenance information of non-active coordinator 115 indicates a lower capability to provide the active coordinator service than active coordinator 110 (e.g., a lower battery level, an inability to establish a communication link, etc.), IoT service device 135 may select active coordinator 110 as the candidate active coordinator. According to this exemplary scenario, assume that IoT service device 135 selects a non-active coordinator 115 to provide the active coordinator service.

In step (10), in response to the selection, IoT service device 135 may generate and transmit a response to active coordinator 110. The response may indicate that a dynamic network role-switching procedure is to be initiated. The response may also indicate the non-active coordinator 115 that is to be involved in the network role-switching procedure. Although not illustrated, active coordinator 110 or IoT service device 135 may generate and transmit a notification that requests service. For example, the notification may include the maintenance information of active coordinator 110 and other information (e.g., locale of active coordinator 110, a network identifier of active coordinator 110, etc.) and may be transmitted to a network administrator. The network administrator may initiate a service call (e.g., to change the battery, etc.).

In step (11), active coordinator 110 receives the response and transmits switch procedure information to the selected non-active coordinator 115. For example, the switch procedure information may indicate to turn on or enable the active coordinator service. Additionally, for the example, the switch procedure information may indicate a date and timestamp for turning on or enabling the active coordinator service.

In steps (12) and (13), non-active coordinator 115 and active coordinator 110 perform a network role-switching procedure in which non-active coordinator 115 operates to perform the active coordinator service and active coordinator 110 operates to perform the non-active coordinator service. For example, non-active coordinator 115 may disable or turn off hardware or hardware and software that support the non-active coordinator service (e.g., sensor logic, etc.) and enable or turn on hardware or hardware and software that support the active coordinator service (e.g., LTE Cat-M1 modem, wireless interfaces to communicate with IoT devices 120, aggregation logic, etc.). Additionally, for example, active coordinator 110 may disable or turn off hardware or hardware and software that support the active coordinator service, and enable or turn on hardware or hardware and software that support the non-active coordinator service.

In step (14), non-active coordinator 115 (now operating as an active coordinator) transmits a message, which includes role switching information, to IoT devices 120 (and other non-active coordinators 115 (not shown)). For example, the role switching information may indicate that non-active coordinator 115 is operating as the active coordinator, and IoT devices 120 (and other non-active coordinators including active coordinator 110) will transmit sensor information and maintenance information to non-active coordinator 115.

Although FIG. 2 illustrates an exemplary process of the self-healing service, according to other exemplary embodiments, additional, fewer, and/or different operations of the self-healing service may be performed.

FIG. 3 is a diagram illustrating an exemplary process of the self-healing service. For example, the process illustrated and described pertains to an exemplary implementation of the local self-healing service. Referring to FIG. 3, as illustrated in step (1), IoT device 120 may transmit sensor information to active coordinator 110. In step (2), non-active coordinator 115 may also transmit sensor information to active coordinator 110. For example, non-active coordinator 115 may be operating to provide the non-active coordinator service. In step (3), active coordinator 110 may receive and aggregate the sensor information according to the active coordinator service. In step (4), active coordinator 110 transmits the aggregated sensor information to IoT service device 135 (e.g., a cloud device) via intermediary network 125.

In step (5), active coordinator 110 determines whether it is able to provide the active coordinator service based on certain criteria. For example, active coordinator 110 may determine whether its battery level is above a threshold battery level. Additionally, for example, active coordinator 110 may determine whether a connective state with IoT service device 135 is trouble-free. For example, active coordinator 110 may determine whether the long-range wireless communication interface is operating properly (e.g., based on the execution and analysis of a built-in self test) and/or that signal strength is above a threshold signal value. For example, the signal strength may be implemented as an RSRP, an RSSI, an RSRQ, an SNR, an SINR, and/or another type of channel condition value. According to this exemplary scenario, assume that active coordinator 110 determines that its current battery level is below the threshold battery level and determines that its connective state with IoT service device 135 is trouble-free.

In step (6), in response to such a determination, active coordinator 110 generates and transmits a request for maintenance information to non-active coordinator 115. According to an exemplary implementation, active coordinator 110 may broadcast in the network, which may be received by all devices in the network. According to such an implementation, some devices (e.g., IoT devices 120, routers, etc.) may ignore the request. According to other exemplary implementations, active coordinator 110 may transmit the request as a point-to-point communication (e.g., between active coordinator 110 and a non-active coordinator 115). Active coordinator 110 may store a data structure (e.g., a list, a table, etc.) or a database that indicates non-active coordinator 115 (versus IoT devices 120 that may also be sending sensor information to active coordinator 110) in the network.

In step (7), in response to receiving the request, non-active coordinator 115 may generate battery information. For example, non-active coordinator 115 may measure its battery level and store the battery value. Additionally, or alternatively, non-active coordinator 115 may determine whether its battery level is above a threshold battery level and store the result of the comparison. For example, non-active coordinator 115 may compare the measured battery voltage value (e.g., voltage) to a threshold battery voltage value. Also, in response to receiving the request, non-active coordinator 115 may generate connectivity information. According to an exemplary implementation, non-active coordinator 115 may generate connectivity information that indicates the presence of a long-range wireless communication interface and/or modem. According to another exemplary implementation, non-active coordinator 115 may turn on or enable an LTE Cat-M1 modem and attempt to establish a communication link with a long-range wireless network (e.g., an LTE network). Non-active coordinator 115 may generate connectivity information indicating the presence of the long-range wireless interface/modem, the operability of the long-range wireless interface/modem (e.g., based on the execution and analysis of a built-in self test), and/or the result of the attempt to establish the communication link. According to this exemplary scenario, assume that non-active coordinator 115 is able to establish the communication link, and its battery level is above the threshold battery level. In response to generating the battery information and the connectivity information, in step (7), non-active coordinator 115 generates and transmits a response, which carries maintenance information, to active coordinator 110. The maintenance information may include the battery information and the connectivity information. The maintenance information may include other types of information, such as, for example, date and timestamp information and/or network device identifier. In the event that active coordinator 110 does not receive maintenance information from any non-active coordinator 115, active coordinator 110 may transmit the request to another active coordinator 110 (not illustrated) to obtain maintenance information from another grouping of non-active coordinators 115 associated with the other active coordinator 110 and/or the maintenance information from only the other active coordinator 110.

In step (8), in response to receiving the maintenance information, active coordinator 110 provides the self-healing service. For example, active coordinator 110 analyzes the maintenance information and determines which, if any, non-active coordinator 115 may perform the active coordinator service. For example, active coordinator 110 may select the non-active coordinator 115 that has the highest battery level among other non-active coordinators 115. Additionally, for example, any non-active coordinator 115 that did not have an operable long-range wireless interface/modem and/or was unable to attach to the long-range wireless network may be eliminated as a candidate active coordinator. In the event that the maintenance information of non-active coordinator 115 indicates a lower capability to provide the active coordinator service than active coordinator 110 (e.g., a lower battery level, an inability to establish a communication link, etc.), active coordinator 110 may select active coordinator 110 (e.g., itself) as the candidate active coordinator. According to this exemplary scenario, assume that active coordinator 110 selects a non-active coordinator 115 to provide the active coordinator service.

Although not illustrated, active coordinator 110 may generate and transmit a notification that requests service. For example, the notification may include the maintenance information of active coordinator 110 and other information (e.g., locale of active coordinator 110, a network identifier of active coordinator 110, etc.) and may be transmitted to a network administrator. The network administrator may initiate a service call (e.g., to change the battery, etc.).

In step (9), active coordinator 110 transmits switch procedure information to the selected non-active coordinator 115. For example, the switch procedure information may indicate to turn on or enable the active coordinator service. Additionally, for the example, the switch procedure information may indicate a date and timestamp for turning on or enabling the active coordinator service.

In steps (10) and (11), non-active coordinator 115 and active coordinator 110 perform a network role-switching procedure in which non-active coordinator 115 operates to perform the active coordinator service and active coordinator 110 operates to perform the non-active coordinator service. For example, non-active coordinator 115 may disable or turn off hardware or hardware and software that support the non-active coordinator service (e.g., sensor logic, etc.) and enable or turn on hardware or hardware and software that support the active coordinator service (e.g., LTE Cat-M1 modem, wireless interfaces to communicate with IoT devices 120, aggregation logic, etc.). Additionally, for example, active coordinator 110 may disable or turn off hardware or hardware and software that support the active coordinator service, and enable or turn on hardware or hardware and software that support the non-active coordinator service.

In step (12), non-active coordinator 115 (now operating as an active coordinator) transmits a message, which includes role switching information, to IoT devices 120 (and other non-active coordinators 115 (not shown)). For example, the role switching information may indicate that non-active coordinator 115 is operating as the active coordinator, and IoT devices 120 (and other non-active coordinators including active coordinator 110) will transmit sensor information and maintenance information to non-active coordinator 115.

Although FIG. 3 illustrates an exemplary process of the self-healing service, according to other exemplary embodiments, additional, fewer, and/or different operations of the self-healing service may be performed.

FIG. 4 is a diagram illustrating exemplary components of a device 400 that may correspond to one or more of the devices described herein. For example, device 400 may correspond to components included in active coordinator 110, non-active coordinator 115, IoT service device 135 and other network elements/devices illustrated and described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to active coordinator 110, software 420 may include an application that, when executed by processor 410, provides the functions of the self-healing service, as described herein. Similarly, non-active coordinator 115 may include an application that, when executed by processor 410, provides the functions of the self-healing service, as described herein. Further, IoT service device 135 may include an application that, when executed by processor 410, provides the functions of the self-healing service, as described herein. Also, IoT device 120 may include an application that, when executed by processor 410, provides the functions of the self-healing service, as described herein. For example, IoT device 120 may dynamically adapt its reporting of sensor information to the active coordinator 110 based on the dynamic network role-switching procedure. Software 820 may also include firmware, middleware, microcode, hardware description language (HDL), and/or other form of instruction.

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
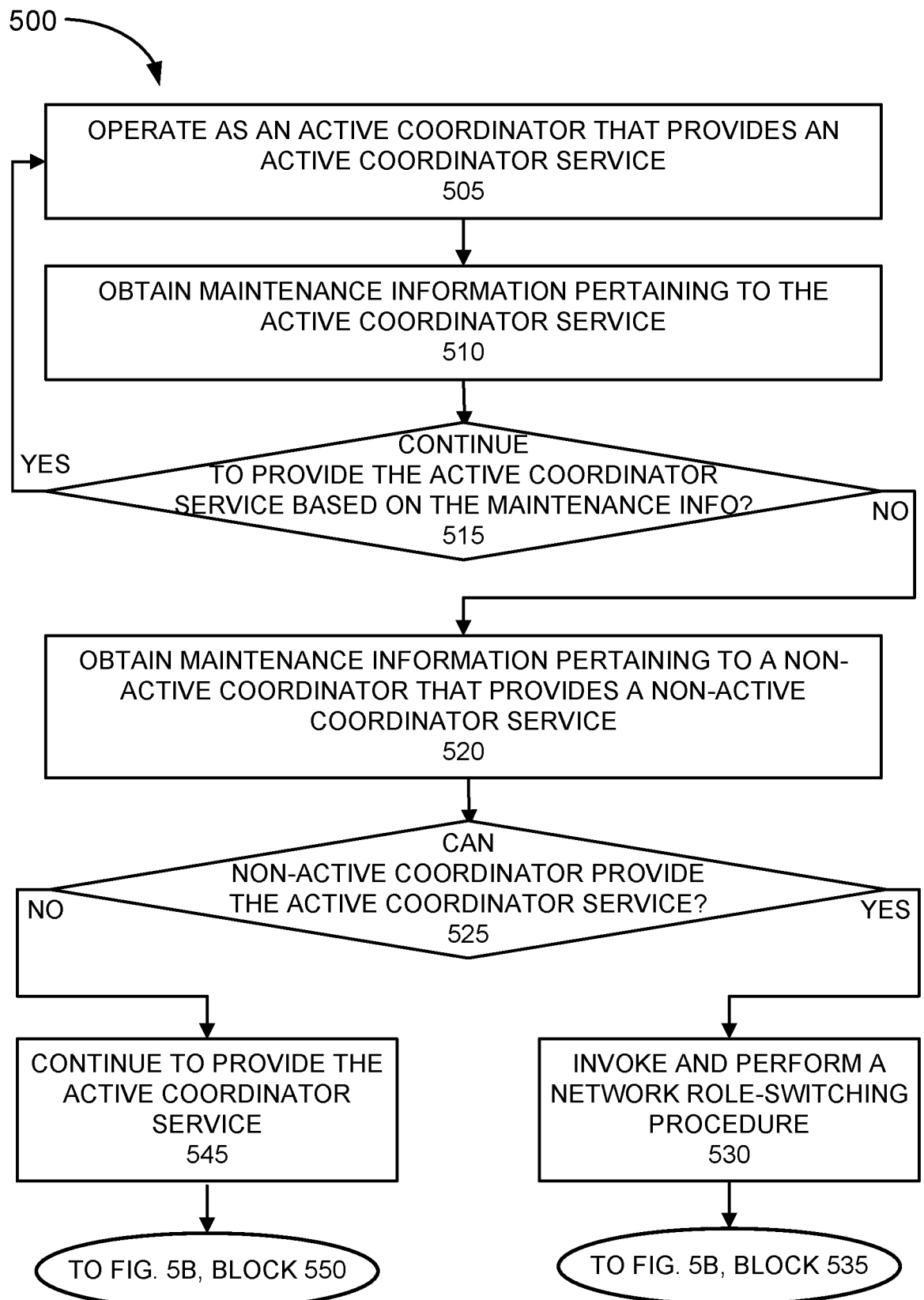

FIGS. 5A and 5B are flow diagrams illustrating an exemplary process 500 of an exemplary embodiment of the self-healing service. Process 500 is directed to a process previously described with respect to FIG. 3, as well as elsewhere in this description, in which a local self-healing service is provided. According to an exemplary embodiment, active coordinator 110 performs steps of process 500. For example, processor 410 executes software 420 to perform the steps illustrated in FIGS. 5A and 5B, and described herein.

Referring to FIG. 5A, in block 505 of process 500, an active coordinator provides an active coordinator service in a sensor-based network. For example, active coordinator 110 maintains an active connection to a network device (e.g., IoT service device 135) that supports an IoT service, collects and/or aggregates sensor information and maintenance information from IoT devices 120 and non-active coordinator 115, and provides the sensor information and the maintenance information to the IoT service device 135.

In block 510, maintenance information pertaining to the active coordinator service is obtained. For example, active coordinator 110 measures its current battery level. Additionally, active coordinator 115 may obtain information indicating the operability of a long-range wireless communication interface/modem and/or information indicating the connectivity status (e.g., a channel condition (e.g., RSRP, etc), up, down, etc.) with IoT service device 135.

In block 515, it is determined whether to continue to provide the active coordinator service based on the maintenance information. For example, active coordinator 115 may determine whether the current battery level is above a threshold battery level based on a comparison between the current battery voltage value and the threshold battery voltage value. Additionally, for example, active coordinator 115 may determine whether the long-range wireless communication interface/modem is operating properly and/or that signal strength is above a threshold signal strength based on a comparison between the current signal strength value and the threshold signal strength value.

When it is determined to continue to provide the active coordinator service (block 515—YES), the active coordinator continues to provide the active coordinator service (block 505). For example, when active coordinator 110 determines that the current battery level is above the threshold battery level and, the long-range wireless communication interface/modem is operating properly and/or the current signal strength is above the threshold signal strength, active coordinator 110 may determine to continue to provide the active coordinator service. For example, process 500 may return to block 505 in which active coordinator 110 continues to provide the active coordinator service in the sensor-based network.

When it is determined to not continue to provide active coordinator service (block 515-NO), maintenance information pertaining to a non-active coordinator, which is providing a non-active coordinator service, is obtained (block 520). For example, when active coordinator 110 determines that the current battery level is equal to or below the threshold battery level, the long-range wireless communication interface/modem is operating improperly, and/or the current signal strength is equal to or below the threshold signal strength, active coordinator 110 may determine to not continue to provide the active coordinator service. As previously described, in response to this determination, active coordinator 110 may broadcast or unicast a request to other devices in the network for maintenance information.

In block 525, it is determined whether the non-active coordinator can provide the active coordinator service. For example, active coordinator 110 may receive maintenance information from non-active coordinator 115 in response to the request. The maintenance information may indicate current battery level and, long-range wireless communication interface/modem operability information and/or connectivity information relative to a long-range wireless network.

Active coordinator 110 may analyze the maintenance information and determine which, if any, non-active coordinator 115 may perform the active coordinator service. For example, active coordinator 110 may select the non-active coordinator 115 that has the highest battery level among other non-active coordinators 115 that satisfy the threshold battery level. Active coordinator 110 may also ensure that the selected non-active coordinator 115 has an operable long-range wireless communication interface/modem and/or is able to attach to the long-range wireless network. In the case of two or more non-active coordinators 115 having equal battery levels, active coordinator 110 may break the tie based on the signal strength values relative to the long-range wireless network (e.g., an LTE network, etc.). Additionally, for example, any non-active coordinator 115 that does not have an operable long-range wireless interface/modem and/or was unable to attach to the long-range wireless network may be eliminated as a candidate active coordinator.

When it is determined that the non-active coordinator can provide the active coordinator service (block 525—YES), a network role-switching procedure is invoked (block 530). For example, active coordinator 110 may transmit switch procedure information to the selected non-active coordinator 115. For example, the switch procedure information may indicate to turn on or enable the active coordinator service. Additionally, for the example, the switch procedure information may indicate a date and timestamp for turning on or enabling the active coordinator service.

Referring to FIG. 5B, in block 535, the active coordinator operates as a non-active coordinator and provides the non-active coordinator service. For example, active coordinator 110 performs the network role-switching procedure in which the active coordinator 110 operates to perform the non-active coordinator service. For example, as previously described, active coordinator 110 may disable or turn off hardware or hardware and software that support the active coordinator service (e.g., LTE Cat-M1 modem, wireless interfaces to communicate with IoT devices 120, aggregation logic, etc.), and enable or turn on hardware or hardware and software that support the non-active coordinator service (e.g., a sensor, logic to report sensor information and maintenance information to the active coordinator, etc.). In block 540, a message for service is transmitted. For example, active coordinator 110 may transmit a message to a network device that notifies a network administrator that service is required. Active coordinator 110 may transmit the message any time after it is determined that active coordinator 110 is unable to provide the active coordinator service (e.g., in block 515-NO) but before the long-range wireless communication interface/modem is disabled or turned off (e.g., in block 530).

Referring back to FIG. 5A, when it is determined that the non-active coordinator cannot provide the active coordinator service (block 525-NO), the active coordinator continues to provide the active coordinator service (block 545). For example, when active coordinator 110 determines that it is the best candidate to continue to provide the active coordinator service, active coordinator 110 may continue to provide the active coordinator service. As an example, when active coordinator 110 determines that no non-active coordinator 115 has a battery level above the threshold battery level and such battery level is below the current battery level of active coordinator 110, active coordinator 110 may determine that it is the best candidate. Additionally, active coordinator 110 may determine that no non-active coordinator 115 has an operable long-range wireless communication interface/modem and/or is able to attach to the long-range wireless network. In the case of one or more non-active coordinators 115 having equal battery levels to active coordinator 110, active coordinator 110 may break the tie based on the signal strength values (e.g., RSRP, RSSI, SINR, etc.) relative to the long-range wireless network (e.g., an LTE network, etc.). Additionally, for example, any non-active coordinator 115 that does not have an operable long-range wireless interface/modem and/or was unable to attach to the long-range wireless network may be eliminated as a candidate active coordinator.

Referring to FIG. 5B, in block 550, a message for service is transmitted. For example, active coordinator 110 may transmit a message to a network device that notifies a network administrator that service is required. Active coordinator 110 may transmit the message any time after it is determined that active coordinator 110 is unable to provide the active coordinator service (e.g., in block 515-NO).

Although FIGS. 5A and 5B illustrate an exemplary process 500 of the self-healing service, according to other embodiments, process 500 may include additional operations, fewer operations, and/or different operations than those illustrated in FIGS. 5A and 5B, and described herein. For example, in step 545, active coordinator 110 may communicate with another active coordinator 110. Active coordinator 110 may determine which is the best candidate based on the metrics similar to that applied to non-active coordinator 115.

Figure 6A:
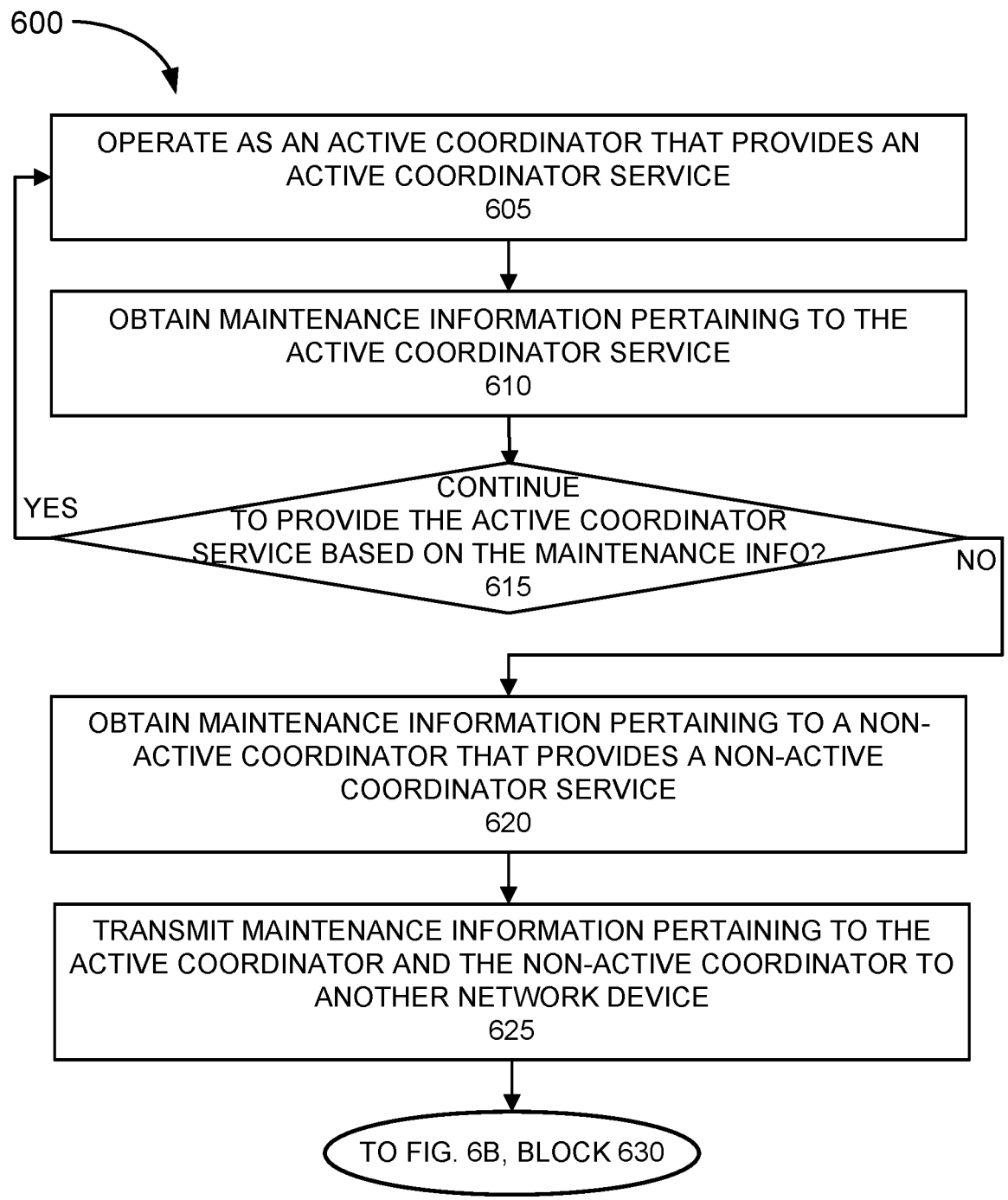
FIGS. 6A and 6B are flow diagrams illustrating another exemplary process of an exemplary embodiment of the self-healing service.
Figure 6B:
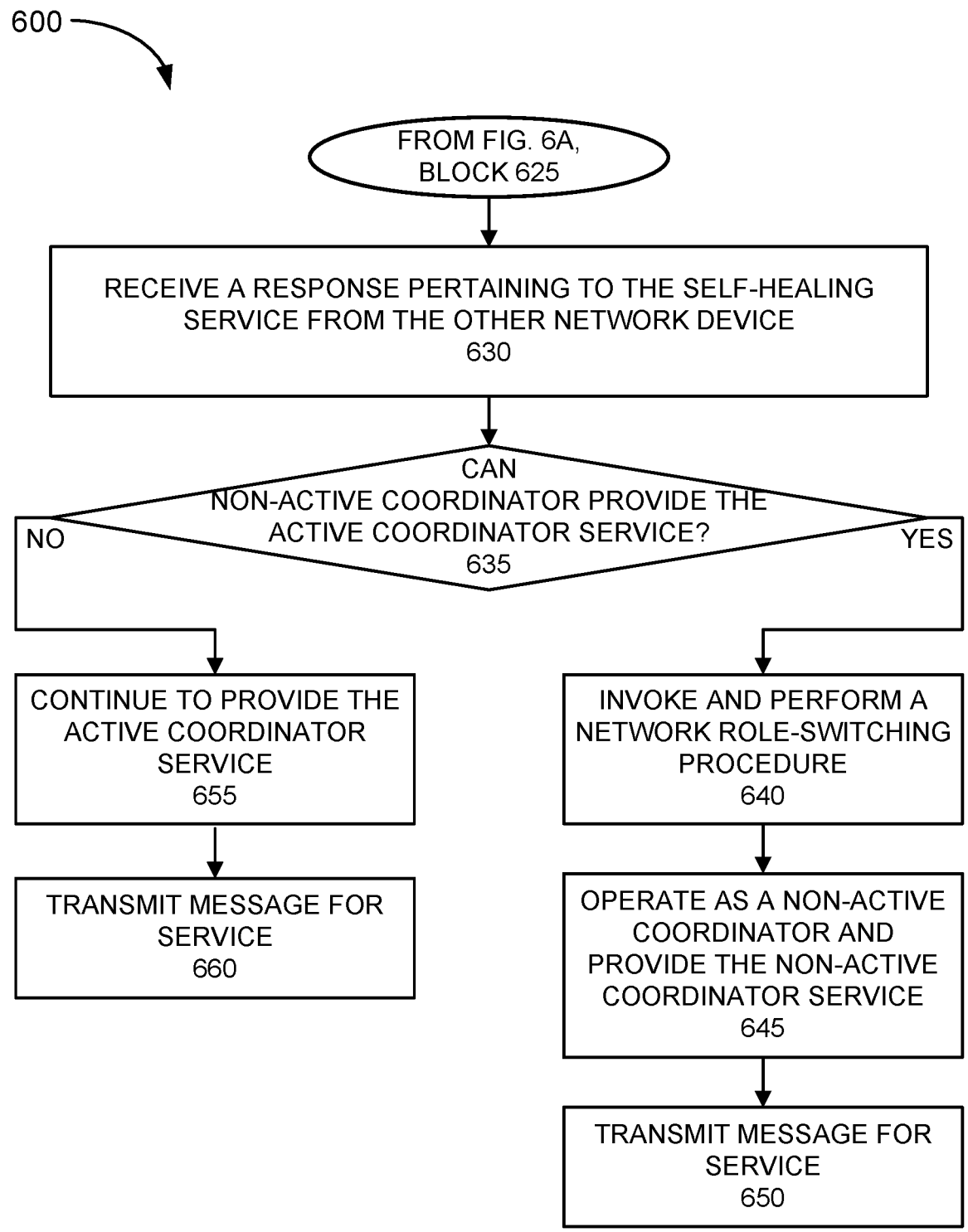

FIGS. 6A and 6B are flow diagrams illustrating an exemplary process 600 of an exemplary embodiment of the self-healing service. Process 600 is directed to a process previously described with respect to FIG. 2, as well as elsewhere in this description, in which a remote self-healing service is provided. According to an exemplary embodiment, active coordinator 110 performs steps of process 600.

For example, processor 410 executes software 420 to perform the steps illustrated in FIGS. 6A and 6B, and described herein.

Referring to FIG. 6A, in block 605 of process 600, an active coordinator provides an active coordinator service in a sensor-based network. For example, active coordinator 110 maintains an active connection to a network device (e.g., IoT service device 135) that supports an IoT service, collects and/or aggregates sensor information and maintenance information from IoT devices 120 and non-active coordinator 115, and provides the sensor information and the maintenance information to the IoT service device 135.

In block 610, maintenance information pertaining to the active coordinator service is obtained. For example, active coordinator 110 measures its current battery level. Additionally, active coordinator 115 may obtain information indicating the operability of a long-range wireless communication interface/modem and/or information indicating the connectivity status (e.g., a channel condition (e.g., RSRP, etc), up, down, etc.) with IoT service device 135.

In block 615, it is determined whether to continue to provide the active coordinator service based on the maintenance information. For example, active coordinator 115 may determine whether the current battery level is above a threshold battery level based on a comparison between the current battery voltage value and the threshold battery voltage value. Additionally, for example, active coordinator 115 may determine whether the long-range wireless communication interface/modem is operating properly and/or that signal strength is above a threshold signal strength based on a comparison between the current signal strength value and the threshold signal strength value.

When it is determined to continue to provide the active coordinator service (block 615—YES), the active coordinator continues to provide the active coordinator service (block 605). For example, when active coordinator 110 determines that the current battery level is above the threshold battery level and, the long-range wireless communication interface/modem is operating properly and/or the current signal strength is above the threshold signal strength, active coordinator 110 may determine to continue to provide the active coordinator service. For example, process 600 may return to block 605 in which active coordinator 110 continues to provide the active coordinator service in the sensor-based network.

When it is determined to not continue to provide active coordinator service (block 615-NO), maintenance information pertaining to a non-active coordinator, which is providing a non-active coordinator service, is obtained (block 620). For example, when active coordinator 110 determines that the current battery level is equal to or below the threshold battery level, the long-range wireless communication interface/modem is operating improperly, and/or the current signal strength is equal to or below the threshold signal strength, active coordinator 110 may determine to not continue to provide the active coordinator service. As previously described, in response to this determination, active coordinator 110 may broadcast or unicast a request to other devices in the network for maintenance information.

In block 625, the maintenance information pertaining to the active coordinator and the non-active coordinator is transmitted to another network device. For example, active coordinator 110 may transmit a request to IoT service device 135. The request may also include data indicating an invocation of the self-healing service.

Referring to FIG. 6B, in block 630, a response to the request pertaining to the self-healing service is received. For example, IoT service device 135 determines the best candidate to continue to provide the active coordinator service based on the maintenance information received. IoT service device 135 may perform operations similar to that of the local self-healing service performed by active coordinator 110 for determining and selecting a best candidate to continue to provide the active coordinator service. IoT service device 135 transmits the response that indicates the network device to provide the active coordinator service. The response may also include data indicate to invoke the dynamic network role-switching procedure.

In block 635, it is determined whether the non-active coordinator can provide the active coordinator service. For example, active coordinator 110 may analyze the response and determine which, if any, non-active coordinator 115 may perform the active coordinator service. In some situations, the response may indicate that active coordinator 115 continue to provide the active coordinator service.

When it is determined that the non-active coordinator can provide the active coordinator service (block 635—YES), a network role-switching procedure is invoked (block 640). For example, active coordinator 110 may transmit switch procedure information to the selected non-active coordinator 115. For example, the switch procedure information may indicate to turn on or enable the active coordinator service. Additionally, for the example, the switch procedure information may indicate a date and timestamp for turning on or enabling the active coordinator service.

In block 645, the active coordinator operates as a non-active coordinator and provides the non-active coordinator service. For example, active coordinator 110 performs the network role-switching procedure in which the active coordinator 110 operates to perform the non-active coordinator service. For example, as previously described, active coordinator 110 may disable or turn off hardware or hardware and software that support the active coordinator service (e.g., LTE Cat-M1 modem, wireless interfaces to communicate with IoT devices 120, aggregation logic, etc.), and enable or turn on hardware or hardware and software that support the non-active coordinator service (e.g., a sensor, logic to report sensor information and maintenance information to the active coordinator, etc.). In block 650, a message for service is transmitted. For example, active coordinator 110 may transmit a message to a network device that notifies a network administrator that service is required. Active coordinator 110 may transmit the message any time after it is determined that active coordinator 110 is unable to provide the active coordinator service (e.g., in block 615-NO) but before the long-range wireless communication interface/modem is disabled or turned off (e.g., in block 645).

When it is determined that the non-active coordinator cannot provide the active coordinator service (block 635-NO), the active coordinator continues to provide the active coordinator service (block 655). For example, when active coordinator 110 determines that it is is the best candidate to continue to provide the active coordinator service, active coordinator 110 may continue to provide the active coordinator service.

In block 660, a message for service is transmitted. For example, active coordinator 110 may transmit a message to a network device that notifies a network administrator that service is required. Active coordinator 110 may transmit the message any time after it is determined that active coordinator 110 is unable to provide the active coordinator service (e.g., in block 615-NO).

Although FIGS. 6A and 6B illustrate an exemplary process 600 of the self-healing service, according to other embodiments, process 500 may include additional operations, fewer operations, and/or different operations than those illustrated in FIGS. 6A and 6B, and described herein. For example, when IoT service device 135 determines, based on the maintenance information, that no non-active coordinator 115 can provide the active coordinator service and/or that active coordinator 110 is the best candidate relative to the non-active coordinator 115, IoT service device 135 may query another active coordinator 110 to determine if the other active coordinator 110 is a better candidate than active coordinator 110. When IoT service device 135 determines that the other active coordinator 110 is a better candidate to provide the active coordinator service, the network role-switching procedure may be performed between the two active coordinators 110.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The words "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5A, 5B, 6A, and 6b, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   providing, by a network device, an active coordinator service in a wireless sensor network, wherein the active coordinator service includes receiving first sensor information from Internet of Things (IoT) devices of the wireless sensor network, aggregating the first sensor information, and transmitting the first sensor information, via a long-range wireless communication interface, to a remote network device residing in an external network that provides an IoT application service;
   obtaining, by and from the network device, first maintenance information pertaining to the network device, wherein the first maintenance information indicates a first battery level of a first battery that powers the network device, a connectivity state to the remote network device via the long-range wireless communication interface, and an operational state of the long-range wireless communication interface based on a self-test;
   analyzing, by the network device, the first maintenance information;
   determining, by the network device, whether the network device can continue to provide the active coordinator service based on the analysis of the first maintenance information;
   requesting, by the network device in response to determining that the network device cannot continue to provide the active coordinator service, second maintenance information from one or more other network devices of the wireless sensor network, wherein each of the second maintenance information indicates a second battery level of a second battery that powers a respective one of the one or more other network devices;
   receiving, by the network device in response to the requesting, the second maintenance information from the one or more other network devices;
   determining, by the network device, whether one of the one or more other network devices can provide the active coordinator service based on the second maintenance information;
   ceasing, by the network device, the providing of the active coordinator service based on determining that the one of the one or more other network devices can provide the active coordinator service, wherein the ceasing includes turning off the long-range wireless communication interface of the network device; and
   enabling, by the network device in response to the ceasing, an IoT service, wherein the network device turns on a sensor of the network device and generates second sensor information via the sensor, and transmits the second sensor information, via a short-range wireless communication interface, to the one of the one or more other network devices.

2. The method of claim 1, wherein the one or more other network devices include one or more non-active backup coordinators, and wherein each of the second maintenance information indicates whether a long-range wireless communication interface of one of the one or more other network devices is operable.

3. The method of claim 2, wherein the determining whether one of the one or more other network devices can provide the active coordinator service comprises:
   comparing the second battery level of each of the second maintenance information to a threshold battery level; and
   determining whether the long-range wireless communication interface of the one of the one or more other network devices is operable based on the second maintenance information.

4. The method of claim 1, further comprising:
   transmitting, by the network device and to the one of the one or more other network devices, information that coordinates the one of the one or more other network devices to provide the active coordinator service and the network device to provide the IoT service.

5. The method of claim 1, further comprising:
   transmitting, by the network device, a request for service of the network device in response to determining that the network device cannot continue to provide the active coordinator service, wherein the request for service includes the first maintenance information.

6. The method of claim 1, wherein the first maintenance information indicates that the connectivity state is intermittent.

7. The method of claim 1, wherein the analyzing comprises:
   comparing, by the network device, the first battery level to a threshold battery level; and
   determining, by the network device, that the network device cannot continue to provide the active coordinator service when the first battery level does not satisfy the threshold battery level.

8. The method of claim 1, wherein the ceasing further comprising:

turning off a component that aggregates the first sensor information.

9. A network device comprising:
a short-range wireless communication interface;
a long-range wireless communication interface;
a memory, wherein the memory stores instructions; and
a processor, wherein the processor executes the instructions to:
provide an active coordinator service in a wireless sensor network, wherein the active coordinator service includes receiving first sensor information from Internet of Things (IoT) devices of the wireless sensor network, aggregating the first sensor information, and transmitting the first sensor information, via the long-range wireless communication interface, to a remote network device residing in an external network that provides an IoT application service;
obtain first maintenance information pertaining to and from the network device, wherein the first maintenance information indicates a first battery level of a first battery that powers the network device a connectivity state to the remote network device via the long-range wireless communication interface, and an operational state of the long-range wireless communication interface based on a self-test;
analyze the first maintenance information;
determine whether the network device can continue to provide the active coordinator service based on the analysis of the first maintenance information;
request, via the short-range wireless communication interface and in response to a determination that the network device cannot continue to provide the active coordinator service, second maintenance information from one or more other network devices of the wireless sensor network, wherein each of the second maintenance information indicates a second battery level of a second battery that powers a respective one of the one or more other network devices;
receive, via the short-range wireless communication interface and in response to the request, the second maintenance information from the one or more other network devices;
determine whether one of the one or more other network devices can provide the active coordinator service based on the second maintenance information;
cease providing the active coordinator service based on a determination that the one of the one or more other network devices can provide the active coordinator service, wherein the cessation includes turning off the long-range wireless communication interface; and
enable an IoT service in response to the cessation, wherein the network device turns on a sensor of the network device and generates second sensor information via the sensor, and transmits, via the short-range wireless communication interface, the second sensor information to the one of the one or more other network devices.

10. The network device of claim 9, wherein the one or more other network devices include one or more non-active backup coordinators, and wherein each of the second maintenance information indicates whether a long-range wireless communication interface of one of the one or more other network devices is operable.

11. The network device of claim 10, wherein, when determining whether one of the one or more other network devices can provide the active coordinator service, the processor further executes the instructions to:
compare the second battery level of each of the second maintenance information to a threshold battery level; and
determine whether the long-range wireless communication interface of the one of the one or more other network devices is operable based on the second maintenance information.

12. The network device of claim 9, wherein the processor further executes the instructions to:
transmit, via the short-range wireless communication interface and to the one of the one or more other network devices, information that coordinates the one of the one or more other network devices to provide the active coordinator service and the network device to provide the IoT service.

13. The network device of claim 9, wherein the processor further executes the instructions to:
transmit, via the long-range wireless communication interface, a request for service of the network device in response to the determination that the network device cannot continue to provide the active coordinator service, wherein the request for service includes the first maintenance information.

14. The network device of claim 9, wherein, when analyzing, the processor further executes the instructions to:
compare the first battery level to a threshold battery level; and
determine that the network device cannot continue to provide the active coordinator service when the first battery level does not satisfy the threshold battery level.

15. The network device of claim 9, wherein, when ceasing, the processor further executes the instructions to:
turn off a component that aggregates the first sensor information.

16. A non-transitory, computer-readable storage medium storing instructions executable by a processor of a device, which when executed cause the device to:
provide an active coordinator service in a wireless sensor network, wherein the active coordinator service includes receiving first sensor information from Internet of Things (IoT) devices of the wireless sensor network, aggregating the first sensor information, and transmitting the first sensor information via a long-range wireless communication interface of the device to a remote network device residing in an external network that provides an IoT application service;
obtain first maintenance information pertaining to and from the device, wherein the first maintenance information indicates a first battery level of a first battery that powers the device a connectivity state to the remote network device via the long-range wireless communication interface, and an operational state of the long-range wireless communication interface based on a self-test;
analyze the first maintenance information;
determine whether the device can continue to provide the active coordinator service based on the analysis of the first maintenance information;
request, in response to a determination that the device cannot continue to provide the active coordinator service, second maintenance information from one or more other network devices of the wireless sensor network, wherein each of the second maintenance information indicates a second battery level of a second battery that powers a respective one of the one or more other network devices;

receive, in response to the request, the second maintenance information from the one or more other network devices;

determine whether one of the one or more other network devices can provide the active coordinator service based on the second maintenance information;

cease providing the active coordinator service based on a determination that the one of the one or more other network devices can provide the active coordinator service, wherein the cessation includes turning off the long-range wireless communication interface of the device; and enable an IoT service in response to the cessation, wherein the device turns on a sensor of the device and generates second sensor information via the sensor, and transmits the second sensor information, via a short-range wireless communication interface, to the one of the one or more other network devices.

17. The non-transitory, computer-readable storage medium of claim 16, wherein the one or more other network devices include one or more non-active backup coordinators, and wherein each of the second maintenance information indicates whether a long-range wireless communication interface of one of the one or more other network devices is operable.

18. The non-transitory, computer-readable storage medium of claim 17, wherein the instructions to determine whether one of the one or more other network devices can provide the active coordinator service further includes instructions executable by the processor of the device, which when executed cause the device to:

compare the second battery level of each of the second maintenance information to a threshold battery level; and determine whether the long-range wireless communication interface of the one of the one or more other network devices is operable based on the second maintenance information.

19. The non-transitory, computer-readable storage medium of claim 16, further storing instructions executable by the processor of the device, which when executed cause the device to:

transmit, to the one of the one or more other network devices, information that coordinates the one of the one or more other network devices to provide the active coordinator service and the device to provide the IoT service.

20. The non-transitory, computer-readable storage medium of claim 16, wherein the instructions to analyze further includes instructions executable by the processor of the device, which when executed cause the device to:

compare the first battery level to a threshold battery level; and determine that the device cannot continue to provide the active coordinator service when the first battery level does not satisfy the threshold battery level.

* * * * *